United States Patent
Beneke et al.

(10) Patent No.: US 7,020,241 B2
(45) Date of Patent: Mar. 28, 2006

(54) METHOD AND DEVICE FOR DETECTING A GIVEN MATERIAL IN AN OBJECT USING ELECTROMAGNETIC RAYS

(75) Inventors: Knut Beneke, Ober-Olm (DE); Joerg Nittikowski, Hohenstein-Holzhausen (DE); Dirk Naumann, Lorsch (DE); Hermann Ries, Taunusstein (DE); Uwe Siedenburg, Essenheim (DE); Claus Meder, Rossdorf (DE); Stefan Ullrich, Saarbruecken-Klarenthal (DE)

(73) Assignee: Heimann Systems GmbH, Wiesbaden (DE)

( * ) Notice: Subject to any disclaimer, the term of this patent is extended or adjusted under 35 U.S.C. 154(b) by 5 days.

(21) Appl. No.: 10/362,929

(22) PCT Filed: Sep. 21, 2002

(86) PCT No.: PCT/EP02/10629

§ 371 (c)(1),
(2), (4) Date: Feb. 27, 2003

(87) PCT Pub. No.: WO03/031960

PCT Pub. Date: Apr. 17, 2003

(65) Prior Publication Data

US 2003/0190011 A1  Oct. 9, 2003

(30) Foreign Application Priority Data

Oct. 5, 2001  (DE)  ................. 101 49 254

(51) Int. Cl.
- G01N 23/04 (2006.01)
- G01N 23/06 (2006.01)
- G01B 15/02 (2006.01)

(52) U.S. Cl. .......................... 378/57; 378/54
(58) Field of Classification Search ............ 378/8, 378/10, 53, 54, 57, 92, 146, 55, 56; 382/131
See application file for complete search history.

(56) References Cited

U.S. PATENT DOCUMENTS 4,928,257 A * 5/1990 Yerkes et al. ................. 378/54

(Continued)

*Primary Examiner*—Allen C. Ho
(74) *Attorney, Agent, or Firm*—Birch, Stewart, Kolasch & Birch, LLP (57) ABSTRACT

A method for the detection of a specific material in an object (1), especially in a piece of luggage, using electromagnetic beams, whereby the intensities of non-absorbed beams from at least three beam planes (5.1–5.2) in corresponding detector arrays (4.1–4.5) are measured and evaluated, using the following steps according to the invention:

1. generating an at least two-dimensional picture of the object (1) from the measured intensity values;

2. selecting one of the spatial regions displayed in the picture as a basis of the value of a material value, which is determined from intensity measurements, for examination;

3. determining at least one spatial-geometric value in the region to the examined from positional data of a two-dimensional picture and from intensity values using a stored value of a specific, absorption-influenced value of a suspected material.

4. determining, in addition, the corresponding spatial-geometric value solely from three-dimensional geometric values, which are determined from measured intensity values; and 5. comparing, directly or indirectly, values of the spatial-geometric values determined in steps 3 and 4, or values derived therefrom, in order to determine if the suspected material is actually present.

13 Claims, 7 Drawing Sheets

U.S. PATENT DOCUMENTS

| | | |
|---|---|---|
| 5,125,015 A | 6/1992 | Shimoni et al. |
| 5,175,756 A * | 12/1992 | Pongratz et al. ............... 378/88 |
| 5,367,552 A * | 11/1994 | Peschmann ................. 378/57 |
| 5,585,603 A * | 12/1996 | Vogeley, Jr. ................. 378/54 |
| 5,712,926 A | 1/1998 | Eberhard et al. ........... 382/205 |
| 5,838,758 A * | 11/1998 | Krug et al. ................... 378/53 |
| 5,966,422 A * | 10/1999 | Dafni et al. .................... 378/9 |
| 6,018,562 A * | 1/2000 | Willson .......................... 378/9 |
| 6,088,423 A | 7/2000 | Krug et al. ................... 378/57 |
| 6,163,591 A | 12/2000 | Benjamin .................... 378/57 |
| 6,215,845 B1 * | 4/2001 | Knigge ........................ 378/57 |
| 6,236,709 B1 * | 5/2001 | Perry et al. ..................... 378/9 |
| 6,347,131 B1 * | 2/2002 | Gusterson .................... 378/57 |
| 6,453,003 B1 * | 9/2002 | Springer et al. .............. 378/57 |
| 6,473,487 B1 * | 10/2002 | Le ................................ 378/57 |
| 6,597,760 B1 * | 7/2003 | Beneke et al. ................ 378/57 |
| 6,788,761 B1 * | 9/2004 | Bijjani et al. ................. 378/57 |
| 2002/0071520 A1 | 6/2002 | Springer et al. .............. 378/57 |

\* cited by examiner

METHOD AND DEVICE FOR DETECTING A GIVEN MATERIAL IN AN OBJECT USING ELECTROMAGNETIC RAYS

This nonprosivional application claims priority under 35 U.S.C. §119(a) on International Application PCT/EP02/10629, filed Sep. 21, 2002.

BACKGROUND OF THE INVENTION

1. Field of the Invention

The invention relates to a method and a device for detecting a specific material in an object, especially in a piece of luggage, using electromagnetic beams, whereby the intensities of non-absorbed beams from at least three beam planes in corresponding detector arrays are measured and evaluated.

2. Description of the Background Art

In conventional methods and devices for the inspection of objects, e.g., security screening of luggage at airports, the object is transported through electromagnetic rays, which radiate from stationary radiation sources. The intensities of the non-absorbed beams are measured and evaluated by the corresponding detector arrays assigned to the radiation sources. Generally, x-rays are used for the inspection.

U.S. Pat. No. 6,088,423-A discloses a method whereby three stationary radiation sources give forth x-rays in three planes parallel to one another, which run vertically to the travel direction. From the data of the three corresponding detector arrays, a computer determines possible contours of the articles in the object and calculates for each article an estimated effective atomic number $Z_{eff}$ and an estimated density. In this manner, the intensities of two energy ranges are evaluated, via the known dual-energy-method.

SUMMARY OF THE INVENTION

It is an object of the invention to provide a method and device for detection of materials in an object, especially in a piece of luggage, which offers the highest possible security in the detection of materials while keeping the device used as simple as possible and, specifically, keeping the number of radiation sources as low as possible.

Conventional computer tomographs use x-ray sources moving around the object and corresponding detectors, in order to create a multitude of images from which the object is reconstructed three-dimensionally with good resolution. With less than 10 views, which are produced with an equivalent number of stationary radiation sources, a complex object is incomplete, because of mathematical reasons, and cannot be reconstructed with sufficient resolution. Therefore, the method of this invention extracts partial information from particular regions, which are selected from individual views and are analyzed further. In the evaluation, to begin with, a spatial geometric value in the area to be examined is determined from positional data of a 2-dimensional picture and from intensity values using a predetermined value of a specific, absorption-influenced value of a suspected material. In addition, the corresponding spatial-geometric value is calculated solely from 3-dimensional geometric values, which are determined from measured intensity values. Next, the values from both evaluations are directly or indirectly compared with one another, in order to determine whether or not the suspected material is indeed present.

The dependent claims contain preferred and especially further advantageous variations of the method of this invention:

In a preferred embodiment, both values of the spatial-geometric value are compared indirectly with one another, whereby the value of a specific material is calculated and is subsequently compared with a predetermined value.

In a further embodiment, the volume of the material in the region is determined from the area and the absorption thickness of the region. In order to calculate the absorption thickness from the measured intensity values, the predetermined value of the specific, absorption-influenced value of a suspected material, especially the predetermined density $\rho$ and/or the predetermined mass attenuation coefficient $\mu/\rho$ is utilized. In a second evaluation, the volume of the material in a region is estimated using spatial positional data only. In a comparison, the values of the volumes or the values derived from a calculated volume value are compared with one another.

Mass is determined by multiplying the volume, calculated from the area and the absorption thickness, with the stored density of a suspected material. The mass thus calculated is subsequently divided by the volume, which was derived solely from spatial positional data. The such calculated density value is compared with a stored density value.

A preferred method for approximation of the volume is to calculate the volume of a polyhedron encircling the region or located in the region to be examined.

In a further embodiment, the absorption thickness corresponding to the position of a 2-dimensional picture is determined by using a stored value of absorption-influenced value, especially the density $\rho$ and/or the mass attenuation coefficient $\mu/\rho$. To verify the evaluation results, the corresponding thickness is determined solely from spatial positional data.

In yet a further embodiment, the object is radiated in at least three separate beam planes, of which at least two are not parallel to one another. With only a few 2-dimensional pictures of the object, the to be examined spatial region can be better defined when the images are as independent from each other as possible, in other words, when they are not solely derived from parallel beam planes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus, are not limitive of the present invention, and wherein.

DETAILED DESCRIPTION OF THE PREFERRED EMBODIMENTS

The inspection device illustrated in the figures is used for security screening of objects 1, particularly pieces of luggage, as done at airports, whereby the articles 2 located in the pieces of luggage are screened for their security relevance.

Essential components of the device are stationary radiation sources 3.1–3.3 and corresponding detectors 4.1–4.5, from which the intensities of the non-absorbed beams are measured. The radiation sources 3.1–3.3 are positioned in such a way that the objects 1 are transilluminated in different directions to receive the greatest possible independent data. For that purpose, the radiation sources 3.1–3.3 are positioned in the travel direction of the objects 1, spaced one after the other and positioned on different sides of the radiation tunnel 6, through which the objects 1 are transported on a transport device, preferably a conveyor 7.

Figure 1:
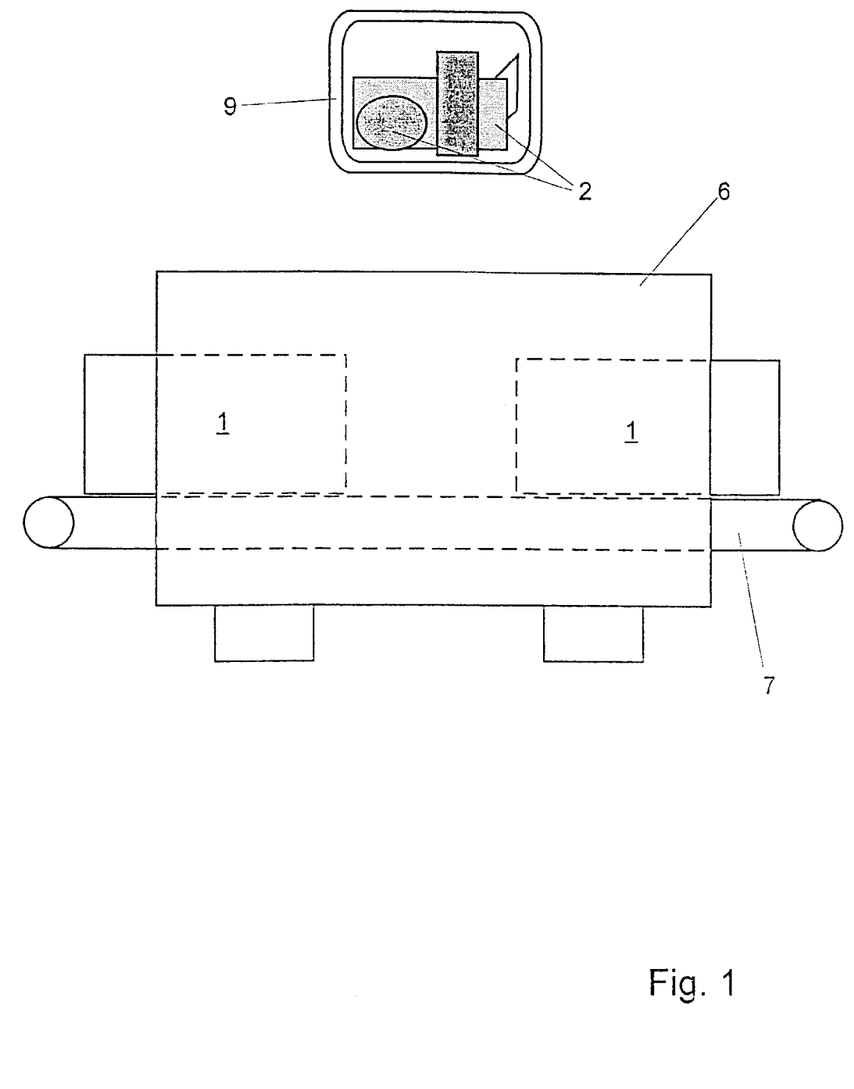
FIG. 1 shows the principal layout of the device.
Figure 2:
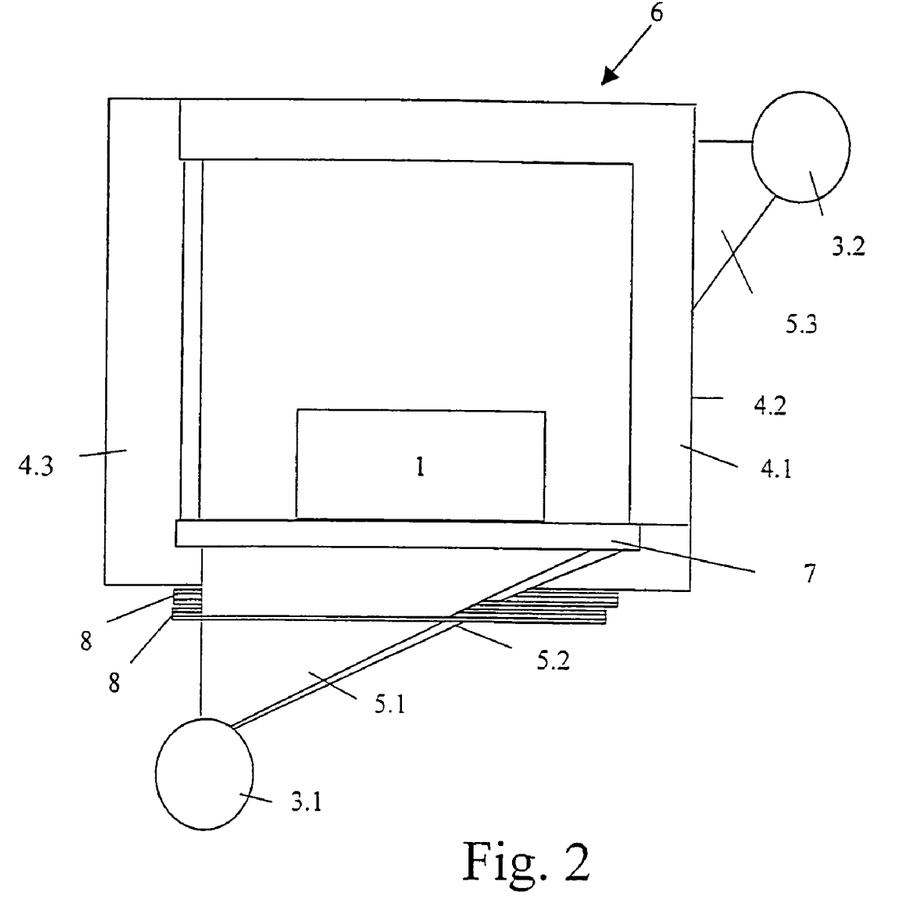
FIG. 2 is a front view of a device, which x-rays the object in three beam planes.
Figure 3:
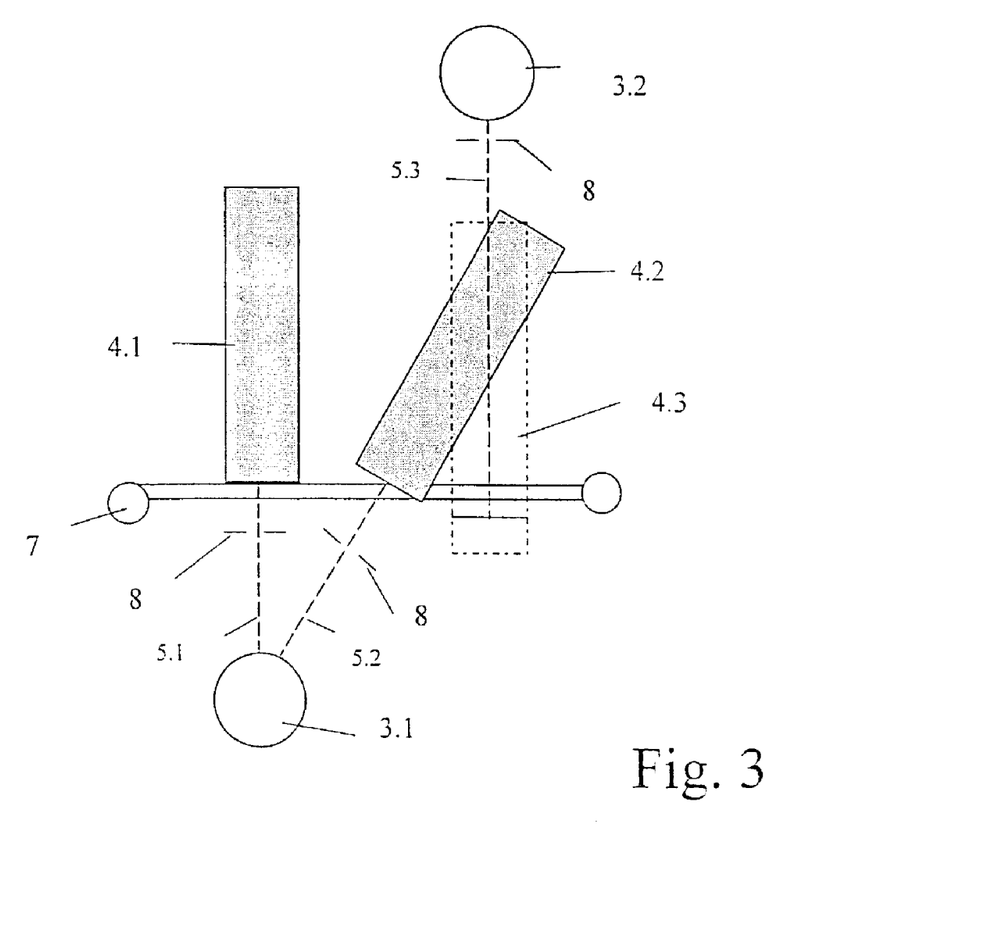
FIG. 3 is a side view that illustrates the array of the radiation sources and detectors of the device of FIG. 2.
Figure 5:
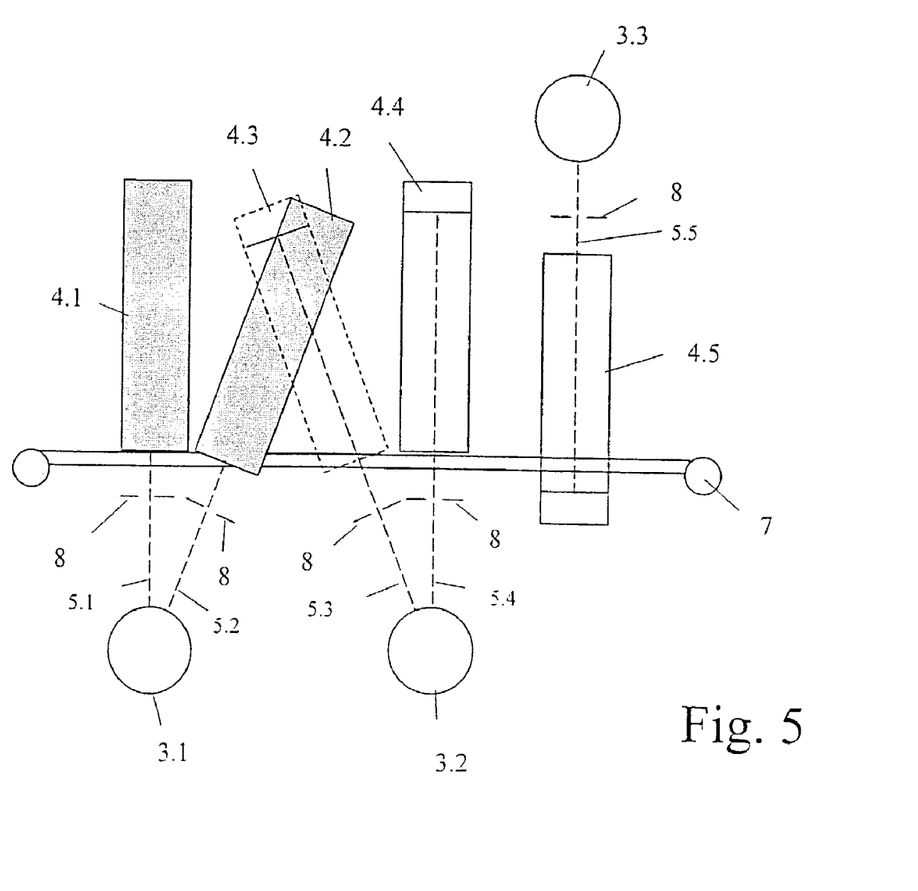
FIG. 5 is a side view of the array of the radiation sources and detectors of the device of FIG. 4.

Beams are projected from at least three, preferably fan-shaped, beam planes 5.1–5.5 for the radiation of an object 1, each beam being aligned to a corresponding detector 4.1–4.5. Preferably, an object 1 is radiated in three separate beam planes 5.1–5.5, of which at least two are not parallel to one another. In the embodiment of FIG. 3, the beam planes 5.1, 5.3 are not parallel to beam plane 5.2; in the embodiment of FIG. 5 beam planes 5.1, 5.4, 5.5 are parallel to one another, the other two beam planes 5.2, 5.3 are inclined against each other as well as against beam planes 5.1, 5,4, 5.5. At least one beam plane is preferably perpendicular to the transport direction of the objects 1. It is advantageous to produce two beam planes, which are inclined to one another, by masking the corresponding beams from a sole radiation source via a collimator 8. The detectors 4.1–4.5 each have detectors with a linear array, preferably L-shaped, so that all the beams passing through the object 1 are detected. The radiation sources 3.1–3.3 supply x-rays in an energy range up to a maximum of 140 keV. The detectors 4.1–4.5 contain dual detectors, which measure the intensities separately for high and low energies, for the so-called dual-energy-method.

Furthermore, the system provides an evaluator with a computer and a screen 9, which displays the generated pictures of the objects 1 and the articles 2 found therein, for additional visual inspection by an operator. In the computer, besides the evaluation software, there are stored values of at least one specific, absorption-influenced value of different materials, the presence of which is to be detected. Such materials are especially explosives, the presence of which is to be detected in the object 1.

Figure 6:
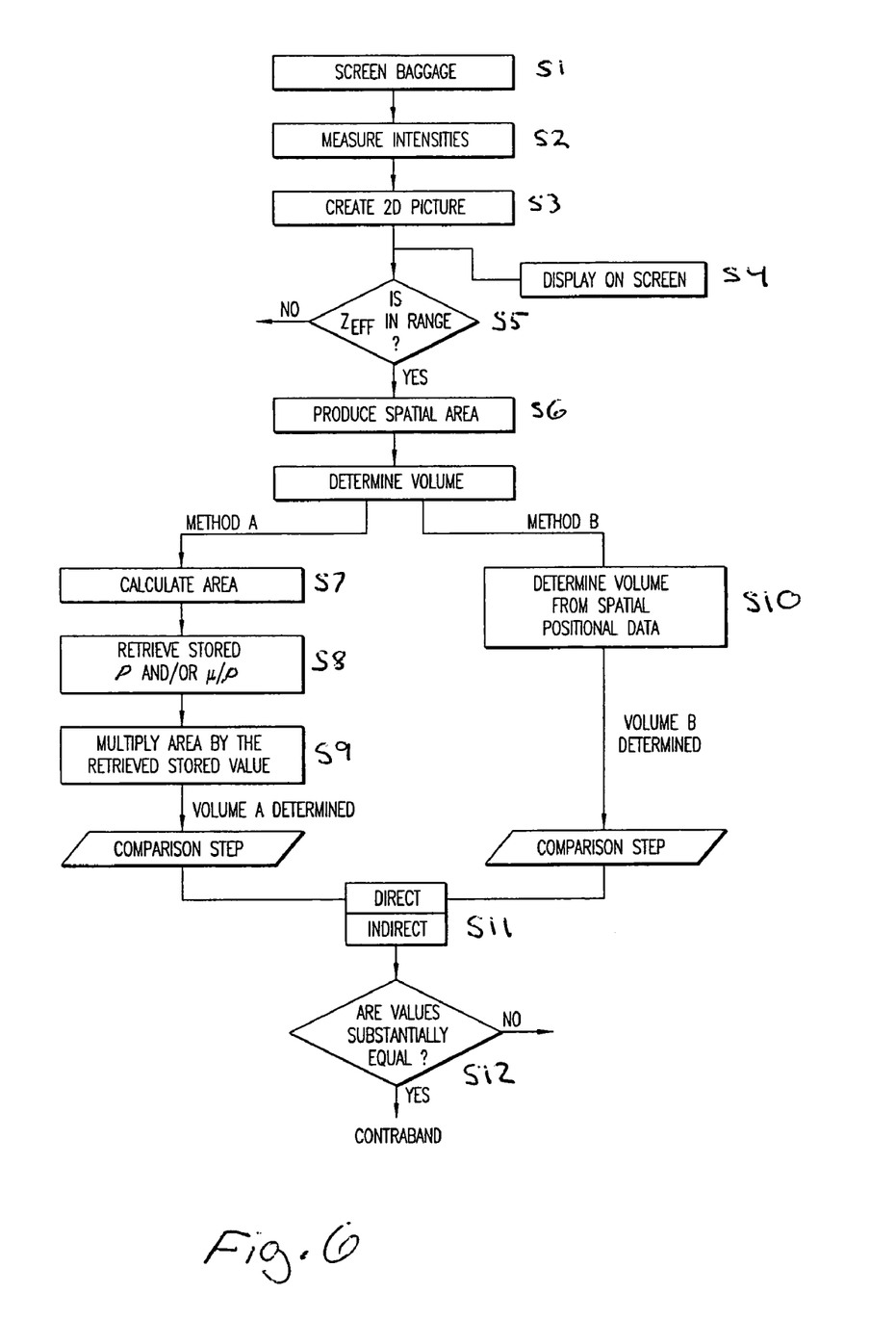
FIG. 6 is a flowchart of a preferred embodiment of the present invention.

In order to detect a particular material in an object 1, for example, an explosive, it is transported on the conveyor belt 7 through the different beam planes 5.1–5.5, wherein the intensities of the non-absorbed radiation beams are measured by the corresponding detector 4.1–4.5, as shown in steps S1 and S2 in FIG. 6. To begin with, in step S3, an at least two-dimensional picture of the object 1 is generated from the measured intensity values and stored in the computer for future processing. The picture is constructed of pixel values of a material value, which are derived from the intensities of the corresponding detectors. The preferred procedure is to determine the value of the effective atomic number $Z_{eff}$ for each picture point, which is ascertained by the known dual-energy method, whereby both intensity values of the high and low energy spectrum are utilized. The ascertained value can be displayed on the screen 9 in step S4 as an assigned gray or color value.

Next, those areas in the picture are determined where the value of the material value, in the example, in step S5, the value of $Z_{eff}$, are in an interesting area, for example, in the value range for explosives. This area of the picture displays an image of a spatial region and thus, an article 2 within the object 1, and is selected out for further examination.

Figure 4:
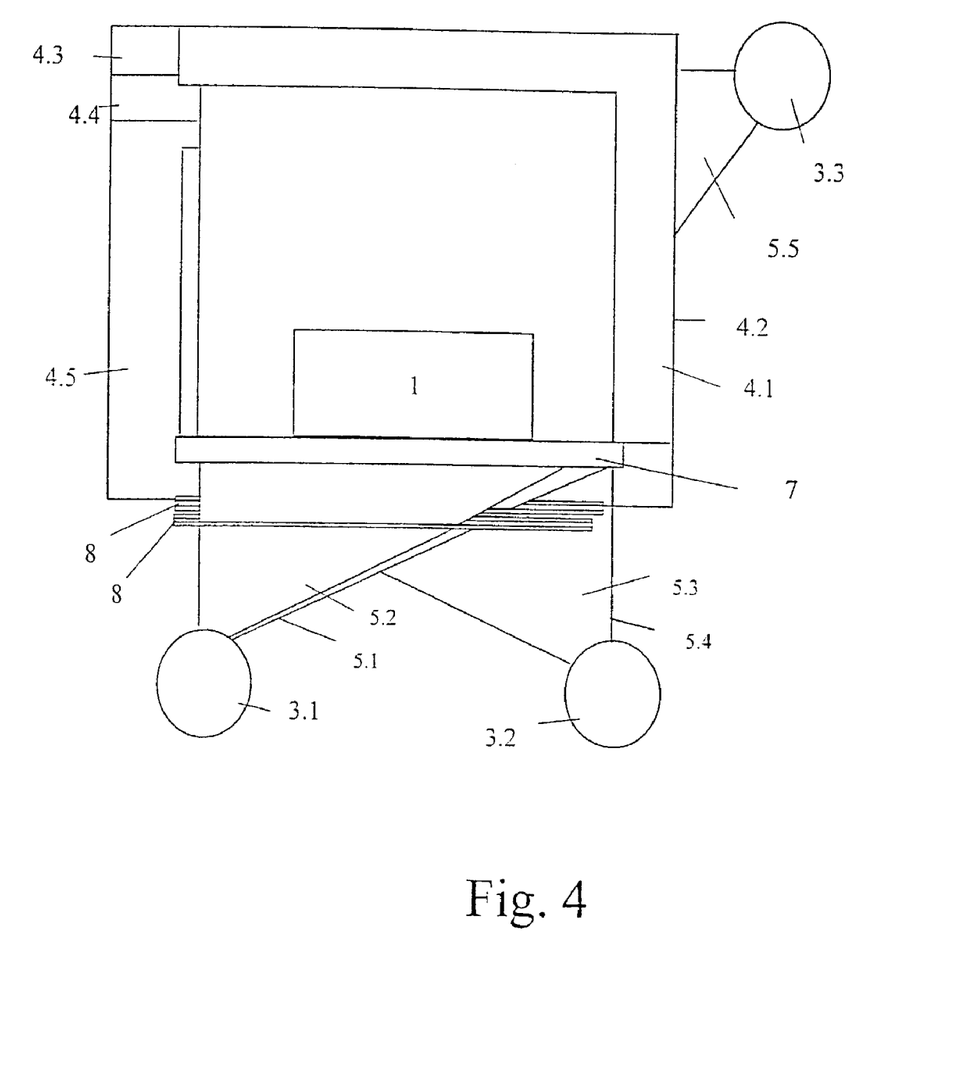
FIG. 4 is the front view of a preferred embodiment, whereby the object is radiated in five beam planes.

In the examination, at least one spatial-geometric value, in step S6, in the area to be examined is determined from positional data of a two-dimensional picture and from intensity values, using a stored value of a specific, absorption-influenced value of a suspected material. Preferably, the values of the density $\rho$ and/or the mass attenuation coefficient $\mu/\rho$ of the materials to be detected are stored and used. Additionally, the corresponding spatial-geometric value is determined solely from three-dimensional values, which are determined from the measured intensity values. To determine the spatial-geometric values as accurately as possible, in the preferred embodiments of FIGS. 4 and 5, five different two-dimensional pictures are generated, from which the corresponding three-dimensional values are calculated. Finally, the two determined values of the spatial-geometric value or from values derived from the value of the spatial-geometric value are directly or indirectly compared with one another to determine if the suspected material is actually present.

A preferred spatial-geometric value is the volume of the material in the spatial area to be tested. The volume is determined two different ways: in the first determination, as shown in Method A of FIG. 6, the area of the two-dimensional picture of the area to be examined is calculated first, in step S7. Next, the absorption thickness of the spatial area is determined from the intensity values of the radiation that passed through the area. In order to determine the absorption thickness, a stored value of a specific, absorption-influenced value of a suspected material is retrieved in step S8, in particular the density $\rho$ and/or the mass attenuation coefficient $\mu/\rho$. The result is the volume of the material in the region as a product of the area and the absorption thickness, step S9.

In an additional step, the approximate volume of the material in the region is determined from spatial positional data, as can be seen in step S10 of FIG. 6, which can be exclusively determined from the intensity values of at least three detector arrays. In a preferred method, the volume of a polyhedron is calculated, which is situated in the region or encases the region, which are determined as intensity values when transporting the object 1 through at least three beam planes.

Figure 7A:
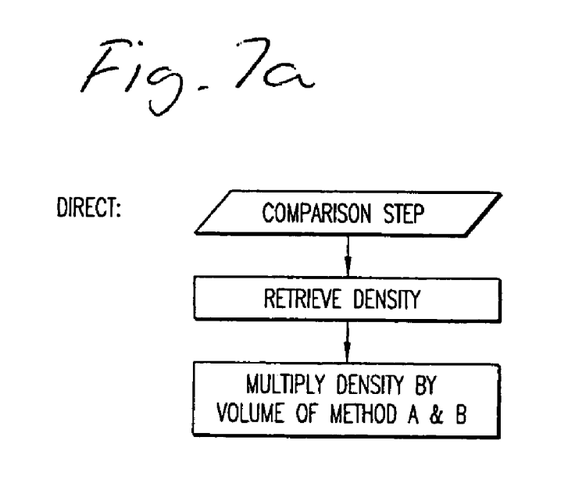
FIGS. 7a and b are continuations of the flowchart of FIG. 6.

To check if the suspected material is actually present, in a variation, the values of the volumes or the values of the calculated volume value are subsequently compared directly to one another in step S11, which have been determined according to both methods. Preferably, as can be seen in FIG. 7a, for comparing purposes, in both methods the mass of the materials in the region to be examined is determined as the product of the volume and the stored density. This has the benefit that a minimal mass can be determined, which is necessary for the subsequent screening.

Figure 7B:
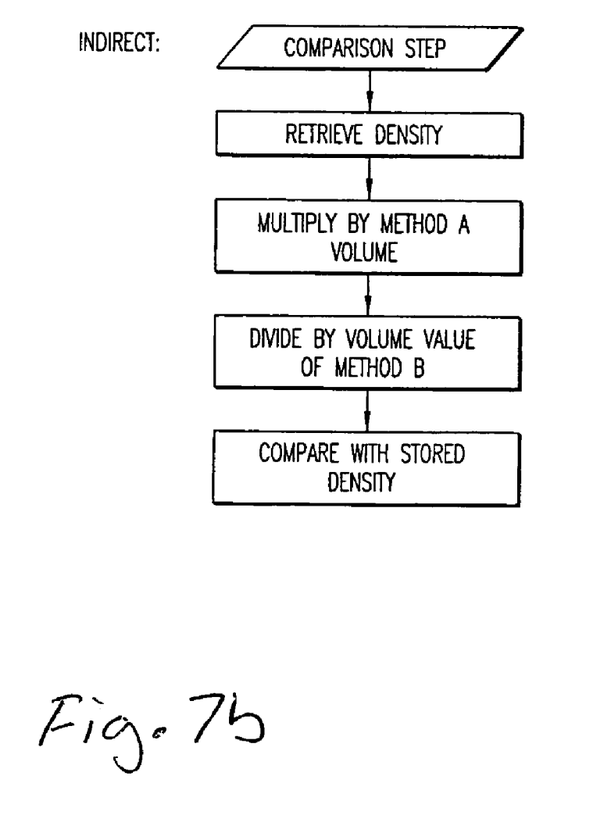

A preferred way of an indirect comparison, with reference to FIG. 7b, of the volumes resulting from the two methods is such that the volume value calculated, using the absorption thickness, is multiplied with the stored density value $\rho$ of the suspected material in order to determine the mass of the material in the area to be examined. From the mass thus determined, a density value is determined by dividing the volume value ascertained solely from positional data arrived at through the second method and is then compared with a stored density value. This method, too, has the benefit that in a first step a mass is calculated from which a minimal value for the continuation of the examination process can be ascertained.

In a case where the suspected material is present, the comparison values coincide sufficiently exactly in both the direct and the indirect method, step S12.

Alternatively to the determination of the volume, the absorption thickness of the area can also be determined as a geometric value, whereby the absorption thickness assigned to a position in a two-dimensional picture using a stored value of the specific, absorption-influenced value of a suspected material is determined. Preferably, as in the previously described volume determination, values of the density $\rho$ and/or the mass attenuation coefficient $\mu/\rho$ of the materials to be detected are stored. The absorption thickness is preferably calculated under the assumption that the material in the area has a certain density.

Furthermore, the absorption thickness assigned to this point is determined solely from spatial positional data, which is determined through a three-dimensional analysis of at least three two-dimensional pictures from various beam planes 5.1–5.5. Finally, the two both of the determined thicknesses, or values derived therefrom, for example, the densities or the masses, are compared with one another. If the suspected material is present, both values are sufficiently exactly the same.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a specific material in an object using electromagnetic beams, whereby intensities of non-absorbed beams from at least three beam planes in corresponding detector arrays are measured and evaluated, said method comprising the steps of:
    a) generating at least a two-dimensional picture of the object from the measured intensity values;
    b) selecting one of the spatial regions displayed in the picture on a basis of the value of a material value, which is determined from intensity measurements, for examination;
    c) determining a first spatial-geometric value in the region to be examined from positional data of a two-dimensional picture and from intensity values using a stored value of a material-specific, absorption-influenced value of a suspected material;
    d) determining a second spatial-geometric value solely from three-dimensional geometric values, which are determined from measured intensity values; and
    e) comparing, directly or indirectly, the first spatial-geometric value with the second spatial-geometric value in order to determine if the suspected material is actually present.

2. The method of claim 1, wherein an indirect comparison is executed in such a way that by using both values of the spatial-geometric values of steps c and d, the value of a specific material value is calculated, which subsequently is compared with a stored value.

3. The method of claim 1, wherein
    in step c, the area of the image of the region to be examined is calculated, and the volume of the material in the region of the area and the absorption thickness of the region is subsequently determined as a spatial-geometric value, whereby the absorption thickness is determined from measured intensity values and the stored value of the specific, absorption-influenced value of a suspected material, and
    wherein in step d, the approximate volume of the material of the region is determined from spatial positional data, which are determined from intensity values of at least three detector arrays.

4. The method of claim 3, wherein in step e, the values of the volume or the values of a value calculated with a volume are compared with one another.

5. The method of claim 4, wherein mass values are compared with one another, which were calculated by multiplying the volume values with the density value, which was stored or determined from the stored value.

6. The method of claim 3, wherein in step c, a mass of the material in the region is calculated with the volume of the material and the stored density, and
    wherein in step e, for an indirect comparison, the density of the mass determined in step c and the volume determined in step d is calculated and compared with the stored density value.

7. The method of claim 3, wherein for the approximation of the volume in step d, the volume of a polyhedron, either located in the region or encompassing the region, is calculated from positional data, which is derived from intensity values of at least three detector arrays.

8. The method of claim 1, wherein
    in step c, an absorption thickness of the region corresponding to a position of the two-dimensional picture, utilizing a stored value of the specific, the absorption-influenced value of a suspected material is determined;
    in step d, the corresponding thickness of the region is determined from spatial positional data, which was derived solely from intensity values of at least three detector arrays; and
    in step e, the two determined thicknesses, or values derived therefrom, are compared to one another.

9. The method of claim 1, wherein the material value in the selection in step b is based on the effective atomic number $Z_{eff}$.

10. The method of claim 1, wherein the stored material-specific, absorption-influenced value in step c is density $\rho$ and/or mass attenuation coefficient $\mu/\rho$.

11. The method of claim 1, wherein the object is radiated in at least three separate beam planes, of which at least two are not parallel to one another.

12. The method of claim 11, wherein the object is transported through the beam planes for radiation.

13. A device comprising:
    a transport device for moving an object through a radiation tunnel;
    radiation sources, which are positioned around the transport device, said radiation sources emitting beams in at least three beam planes, each being aligned with a corresponding detector,
    wherein at least two of the beam planes are not parallel with one another; and
    an evaluator for detecting a specific material in the object by:
        a) generating at least a two-dimensional picture of the object from the measured intensity values;

b) selecting one of the spatial regions displayed in the picture on a basis of the value of a material value, which is determined from intensity measurements, for examination;
c) determining a first spatial-geometric value in the region to be examined from positional data of a two-dimensional picture and from intensity values using a stored value of a material-specific, absorption-influenced value of a suspected material;

d) determining a second spatial-geometric value solely from three-dimensional geometric values, which are determined from measured intensity values; and
e) comparing, directly or indirectly, the first spatial-geometric value with the second spatial-geometric value in order to determine if the suspected material is actually present.

* * * * *